United States Patent [19]

Maruyama

[11] 4,103,482
[45] Aug. 1, 1978

[54] WRISTWATCH HAVING A LIQUID CRYSTAL DISPLAY

[76] Inventor: Mitsuaki Maruyama, 3-5, 3-chome, Owa Suwa-shi, Nagano-ken, Japan

[21] Appl. No.: 664,463

[22] Filed: Mar. 8, 1976

[30] Foreign Application Priority Data

Mar. 7, 1975 [JP] Japan .................... 50-28460

[51] Int. Cl.² .................. C09K 3/34; G02F 1/13; G04C 3/00
[52] U.S. Cl. .................. 58/23 R; 58/50 R; 58/23 BA; 58/23 TF; 252/299; 350/350
[58] Field of Search ............... 58/50 R, 23 R, 23 BA, 58/23 TF; 252/299; 350/160 LC

[56] References Cited

U.S. PATENT DOCUMENTS

| | | | |
|---|---|---|---|
| 3,683,213 | 8/1972 | Staudte | 58/23 TF |
| 3,697,766 | 10/1972 | Ganter et al. | 58/23 TF |
| 3,697,789 | 10/1972 | Kato et al. | 58/23 TF |
| 3,864,905 | 2/1975 | Richardson | 58/50 R |
| 3,919,105 | 11/1975 | Katagiri et al. | 252/299 |
| 3,943,699 | 3/1976 | Daniels | 58/50 R |
| 3,946,550 | 3/1976 | Fujita | 58/50 R |
| 3,949,546 | 4/1976 | Saito | 58/50 R |
| 3,954,653 | 5/1976 | Yamazaki | 252/299 |
| 3,959,964 | 6/1976 | Yamazaki | 58/50 R |
| 3,975,286 | 8/1976 | Oh | 252/299 |
| 3,981,817 | 9/1976 | Boller et al. | 252/299 |
| 3,984,344 | 10/1976 | Cole, Jr. | 252/299 |
| 4,009,938 | 3/1977 | Yamazaki et al. | 252/299 |
| 4,011,173 | 3/1977 | Steinstrasser | 252/299 |

FOREIGN PATENT DOCUMENTS

| | | | |
|---|---|---|---|
| 2,359,777 | 6/1974 | Fed. Rep. of Germany | 252/299 |
| 2,321,632 | 11/1974 | Fed. Rep. of Germany | 252/299 |
| 4,934,488 | 3/1974 | Japan | 252/299 |
| 4,988,791 | 8/1974 | Japan | 252/299 |

*Primary Examiner*—Benjamin R. Padgett
*Assistant Examiner*—T. S. Gron
*Attorney, Agent, or Firm*—Blum, Moscovitz, Friedman & Kaplan

[57] ABSTRACT

An ultra-thin wristwatch utilizes a liquid crystal display cell operable by a single electrochemical cell without the use of a voltage booster. Through the use of an extremely small piezoelectric tuning fork vibrator and electronic circuitry consisting of a C-MOS, it becomes possible to manufacture a movement having a thickness less than 5 mm.

8 Claims, 9 Drawing Figures

WRISTWATCH HAVING A LIQUID CRYSTAL DISPLAY

BACKGROUND OF THE INVENTION

Battery-powered wristwatches utilizing liquid crystal display cells, particularly those operating by means of the field-effect, have been relatively thick due to a variety of factors. As is well knonw, minimization of the thickness of a wristwatch is highly desirable, especially in the fabrication of watches to be worn by women. The high premium placed upon watches of low thickness is such that minimization of the thickness is a major objective in the development of electronic wristwatches.

As aforenoted, a number of factors are involved in establishing the thickness of wristwatches at undesirably high levels. These factors include the necessity for a booster element in the electronic circuitry when the attempt is made to operate the liquid crystal cell and the circuitry by means of a single electrochemical cell. Conversely, when it is attempted to utilize circuitry which does not incorporate a booster circuit, then it becomes necessary to use a plurality of electrochemmical cells, namely a battery. A battery, of course, occupies space in excess of that occupied by a single cell.

In wristwatches of conventional design the battery must be large for a second reason also. Where two electrochemical cells, for instance, are required rather than one, the voltage is, of course, twice as high. As a result, the current which flows is twice as great. Consequently, the life of a battery as it operates to power a wristwatch, is cut in half. Where a single electrochemical cell is used in combination with a booster, the current which is drawn is similarly increased so that, again, the life of the electrochemical cell is cut severely. To compensate for this decrease in the life, the cell or battery size must be increased so that a greater quantity of electrochemically-active material is present. This, again, increases the size of the wristwatch. Moreover, if a booster is required, extra electronic components must be incorporated and these, in the form of coils and capacitors are space-consuming.

As is evident, a principal factor in decreasing the size of wristwatches from those now available is the nature of the liquid crystal composition used in the display cell. Where a composition can be developed which operates at a lower voltage, and consequently at a lower current, the drain is correspondingly lower and the life of the cell is increased.

One further point is significant, namely, the type of piezoelectric vibrator used for supplying a time standard. Vibrators of the conventional type have a minimum thickness of about 0.5 mm, a minimum width of about 1.5 mm, and a length of about 6 mm. The volume of such a vibrator, taking into account the space which must be provided around it, becomes substantial in terms of attempting to make a wristwatch of minimal thickness. Accordingly, it would be highly desirable to provide liquid crystal compositions which require both low voltage and low current for operation as well as a vibrator of small dimensions, the whole being operated by the power provided by a single electrochemical cell.

SUMMARY OF THE INVENTION

In a field-effect liquid crystal display the threshold voltage Vth is defined as the voltage at which the contrast is 90% of the saturation value Vsa. Vth is increased by up to about 0.2 V on dropping the temperature from 25° C to 0° C. Accordingly, the saturation voltage Vsa must be under 1.5 at 0° C in order to obtain adequate contrast when the display is driven by a single cell providing a maximum 1.5 volts.

Compositions having the desired properties consist of cyanophenyl-n-alkylbenzoates combined with an alkoxyphenyl-n-alkylbenzoate. Such compositions have an operating temperature range from about 0° C up to about 50° C and are extremely stable both with respect to oxygen and moisture.

Further reduction in volume of the system is obtained by preparing piezoelectric vibrators of extremely small size by means of a photo-etching process, placing the liquid crystal display cell and the battery in side-by-side relationship within the wristwatch and using circuitry of the complementary MOS integrated circuit type.

Accordingly, an object of the present invention is an electronic wristwatch of minimum size operable by a single electrochemical cell.

A further object of the present invention is an electronic wristwatch utilizing a liquid crystal display cell of the field-effect type where the liquid crystal material has a voltage threshold no greater than 1.5 volts even at 0° C.

A further object of the present invention is an electronic wristwatch of minimal size which can be manufactured at low cost and which has therein a piezoelectric vibrator of the tuning fork type where the vibrator is substantially smaller in size than has hitherto been available.

An important object of the present invention is an electronic wristwatch of minimal size incorporating a liquid crystal display cell dependent on field-effect liquid crystal materials, where the liquid crystal material is extremely stable with respect to both moisture and oxygen.

Yet another object of the present invention is an electronic wristwatch of minimal size using complementary MOS integrated circuitry which is free of a booster.

Still other objects and advantages of the invention will in part be obvious and will in part be apparent from the specification.

The invention accordingly comprises an article of manufacture possessing the features, properties, and the relation of elements which will be exemplified in the article hereinafter described, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

Figure 1:
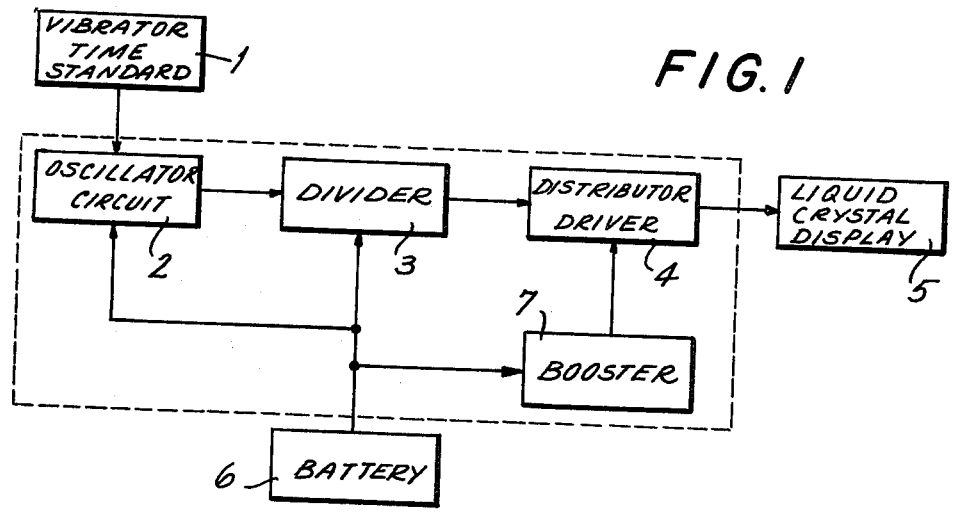
FIG. 1 is a block diagram of the electrical circuitry and interior construction of a conventional wristwatch with a liquid crystal display.

The construction of a conventional wristwatch using a field-effect liquid crystal display is shown in block diagram in FIG. 1 in which the elements surrounded by the dashed line constitute the electronic circuitry. As shown in the diagram, piezoelectric vibrator 1 is used as the time standard, controlling an oscillator circuit 2, the signal from the oscillator being divided by divider circuit 3 which transmits its signal to distributing and driving circuit 4. The distributor-divider drives liquid crystal display means 5. Power for the piezoelectric vibrator, the circuitry and the liquid crystal display is supplied by battery 6.

Since conventional liquid crystal display cells cannot be operated at voltages as low as 1.5 V, this being the output voltage of single electrochemical cells, a booster circuit is necessary to raise the voltage supplied to the liquid crystal display to the necessary level. As aforenoted, a booster circuit constitutes a substantial disadvantage with respect to reduction of the size of the wristwatch because of the number of electronic components such as coils and capacitors which are required.

In accordance with the present invention, liquid crystal compositions are described which can be operated at 1.5 V, namely the voltage which can be supplied by a single button cell. This helps to make it possible to decrease the size of the wristwatch, and particularly, to decrease its thickness. Further, because the electric power consumed in a circuit is proportional to the square of the driving voltage in the C MOS IC, it is advantageous to drive all components of the electric circuit at 1.5 V, thereby decreasing the power expended in the circuitry.

When the display means and the electronic circuitry are driven at 1.5 V, the current flowing in the entire system is about 3 mA which is about half that required in conventional systems which operate at 3 to 6 volts. Further, when the driving voltage differs for different parts of the system, it is necessary to design the integrated circuitry in order that the breakdown voltage should be sufficiently great; however, in the system as disclosed herein, the entire system can be driven at 1.5 V so that such difficulties do not arise.

Figure 2A:
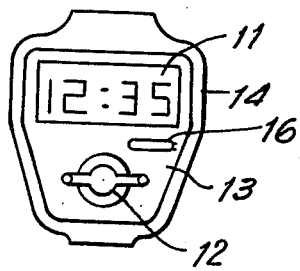
FIG. 2a is a plan view of the face of a wristwatch in accordance with the present invention.
Figure 2B:
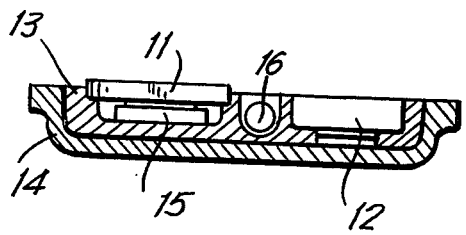
FIG. 2b is a diagrammatic sectional view of a wristwatch in accordance with the present invention.

In the plan view of the watch in accordance with the present invention as shown in FIG. 2a, a liquid crystal display means 11 is driven at 1.5 V and the single electrochemical cell 12 is placed side-by-side with the display means 11, both elements being secured to base plate 13 and encased in case 14. The electronic circuitry is shown schematically by the reference numeral 15, the circuitry using C MOS IC, quartz crystal vibrator 16 being used as the time standard. The quartz crystal is of course a piezoelectric material, and other suitable piezoelectric materials such as lithium titanate can also be used.

By disposing the liquid crystal display means 11 and the electrochemical cell 12 side-by-side and using a button cell having a diameter of 7.7 mm, a thickness of 3.4 mm the capacity being 35 mAH, it becomes possible to produce a movement having a thickness less than 5 mm. Further, because of the fact that the power consumption is so low in systems designed in accordance with the present invention, a button cell can last for one year or more in operating such a movement and display.

Figure 3:
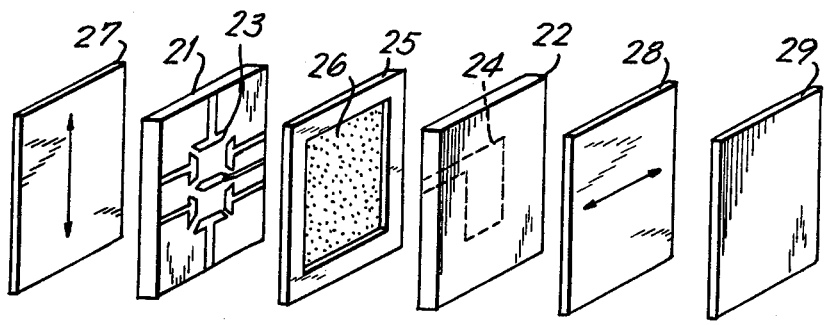
FIG. 3 is a exploded view in perspective of a liquid crystal display cell such as is used in the embodiment o FIGS. 2a and 2b.

The construction of the liquid crystal display cell is shown in FIG. 3. A liquid crystal composition 26 is held within insulating spacer 25 between transparent glass plates 21 and 22. On the inner surfaces of glass plates 21 and 22 are transparent electrodes 23 and 24 of an electroconductive material such as tin oxide or indium oxide. A single seven-segment array 23 is shown on glass plate 21 and a common electrode 24 is shown on glass plate 22. The inner surfaces of glass plates 21 and 22 are oriented as by rubbing with a cotton cloth or by other means, the directions of orientations on the two glass plates 21 and 22 being at right angles to each other. As is well known, nematic liquid crystals having positive dielectric anisotropy orient themselves into a quarter-turn helix when confined in a cell as described. Such a quarter-turn helix rotates the plane of polarized light passing therethrough by 90°. Moreover, when such a plate is sandwiched by polarizer and analyzer filters 27 and 28 which are at right angles to each other, light passes through the system in the absence of an electric field provided that the polarization axes of the two filters are at right angles to each other. Conversely, if the polarization axes of the two filters are parallel to each other, then virtually no light passes through the system in the absence of an electric field. Further, if an electric field equal to or greater than Vth is imposed across selected segments of array 23 then the molecules in this portion of the cell will orient themselves essentially parallel to the electric field and rotation of the plane of polarization will no longer take place in this portion of the system. Assuming that the polarization axes of the filters are at right angles to each other as is shown in FIG. 3, then in those areas across which a sufficient electric field is imposed, no light will pass through the system. The remainder of the cell will appear bright by contrast.

Once the field is removed, the molecules of liquid crystal material return to the helical arrangement throughout the cell. Another point to be considered is that in order to increase the brightness of the display, a reflector 29 may be placed at the further side of the system, namely on the side furthest from the direction from which the display is illuminated.

The voltage needed to drive the liquid crystal material in the display device depends principally upon the liquid crystal composition, and more specifically, on the dielectric anisotropy of the system, the anisotropy being defined as $\Delta\epsilon$ which is equal to $\epsilon_{\|} - \epsilon_{\perp}$. In this definition, $\epsilon_{\|}$ is the dielectric constant of the liquid crystal molecules in a direction parallel to the macro-axis of the molecule and $\epsilon_{\perp}$ is the dielectric constant taken at right angles to the macro-axis of the molecule.

The importance of $\Delta\epsilon$ lies in its influence on the threshold voltage $Vth = \pi\sqrt{k/\Delta\epsilon}$ in which $k$ is a constant. As can be seen from this formula, the larger the dielectric anisotropy, the smaller the necessary driving voltage.

Liquid crystal compounds having the general structural formula

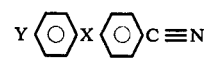

have large dielectric anisotropy. Examples of such compounds and the temperature at which phase changes occur are shown in Table 1, it being noted that C.I indicates the transition from the crystalline to the isotropic liquid phase and I.N indicates the transition from the isotropic to the nematic phase. Also, C.N is the transition from the crystalline to the nematic phase.

TABLE 1

Y—⟨O⟩—X—⟨O⟩—C≡N

1. p-alkylbenzylidene-p'-cyanoaniline

| Compound | temperature of phase change (°C) | | | |
|---|---|---|---|---|
| $C_2H_5$—⟨O⟩—CH=N—⟨O⟩—C≡N | C.I; | 76, | I.N; | 63 |
| $C_3H_7$—⟨O⟩—CH=N—⟨O⟩—C≡N | C.N; | 65, | N.I; | 77 |
| $C_4H_9$—⟨O⟩—CH=N—⟨O⟩—C≡N | C.N; | 38.5 | N.I; | 62 |
| $C_5H_{11}$—⟨O⟩—CH=N—⟨O⟩—C≡N | C.N; | 46, | N.I; | 75 |
| $C_6H_{13}$—⟨O⟩—CH=N—⟨O⟩—C≡N | C.N; | 33, | N.I; | 64 |
| $C_7H_{15}$—⟨O⟩—CH=N—⟨O⟩—C≡N | C.N; | 32.5, | N.I; | 72 |
| $C_8H_{17}$—⟨O⟩—CH=N—⟨O⟩—C≡N | C.N; | 32.5, | N.I; | 69 |

2. p-alkoxybenzylidene-p'-cyanoaniline

| | | | | |
|---|---|---|---|---|
| $CH_3O$—⟨O⟩—CH=N—⟨O⟩—C≡N | C.N; | 106, | N.I; | 120 |
| $C_2H_5O$—⟨O⟩—CH=N—⟨O⟩—C≡N | C.N; | 105, | N.I; | 127 |
| $C_3H_7O$—⟨O⟩—CH=N—⟨O⟩—C≡N | C.N; | 63, | N.I; | 127 |
| $C_4H_9O$—⟨O⟩—CH=N—⟨O⟩—C≡N | C.N; | 63, | N.I; | 106 |
| $C_5H_{11}O$—⟨O⟩—CH=N—⟨O⟩—C≡N | C.N; | 62, | N.I; | 93 |
| $C_6H_{13}O$—⟨O⟩—CH=N—⟨O⟩—C≡N | C.N; | 56, | N.I; | 96 |
| $C_7H_{15}O$—⟨O⟩—CH=N—⟨O⟩—C≡N | C.N; | 78, | N.I; | 92 |
| $C_8H_{17}O$—⟨O⟩—CH=N—⟨O⟩—C≡N | C.N; | 66, | N.I; | 95 |

3. p-alkylbenzylidene-p'-cyanoaniline

| | | | | |
|---|---|---|---|---|
| $C_2H_5COO$—⟨O⟩—CH=N—⟨O⟩—C≡N | C.N; | 111, | N.I; | 125 |
| $C_3H_7\overset{\|}{\underset{O}{C}}$—⟨O⟩—CH=N—⟨O⟩—C≡N | C.N; | 53.7, | N.I; | 97.6 |
| $C_5H_{11}COO$—⟨O⟩—CH=N—⟨O⟩—C≡N | C.N; | 66, | N.I; | 98 |
| $C_6H_{13}COO$—⟨O⟩—CH=N—⟨O⟩—C≡N | C.N; | 54, | N.I; | 94 |
| $C_7H_{15}COO$—⟨O⟩—CH=N—⟨O⟩—C≡N | C.N; | 54, | N.I; | 99 |

4. p-cyanobenzylidene-p'-alkylaniline

| | | | | |
|---|---|---|---|---|
| $C_3H_7$—⟨O⟩—N=CH—⟨O⟩—C≡N | C.N; | 68, | N.I; | 78 |
| $C_4H_9$—⟨O⟩—N=CH—⟨O⟩—C≡N | | | N.I; | 82.5 |
| $C_5H_{11}$—⟨O⟩—N=CH—⟨O⟩—C≡N | C.N; | 75 | N.I; | 78 |
| $C_6H_{13}$—⟨O⟩—N=CH—⟨O⟩—C≡N | C.N; | 63, | N.I; | 75 |
| $C_8H_{17}$—⟨O⟩—N=CH—⟨O⟩—C≡N | C.N; | 66, | N.I; | 73 |

5. p-cyanobenzylidene-p'-alkoxyaniline

| | | | | |
|---|---|---|---|---|
| $C_2H_5O$—⟨O⟩—N=CH—⟨O⟩—C≡N | C.N; | 105, | N.I; | 130 |
| $C_3H_7O$—⟨O⟩—N=CH—⟨O⟩—C≡N | C.N; | 113, | N.I; | 115 |
| $C_4H_9O$—⟨O⟩—N=CH—⟨O⟩—C≡N | C.N; | 63, | N.I; | 110.5 |
| $C_5H_{11}O$—⟨O⟩—N=CH—⟨O⟩—C≡N | C.N; | 62.5, | N.I; | 100 |
| $C_6H_{13}O$—⟨O⟩—N=CH—⟨O⟩—C≡N | C.N; | 54.5, | N.I; | 103 |
| $C_7H_{15}O$—⟨O⟩—N=CH—⟨O⟩—C≡N | C.N; | 50, | N.I; | 85 |
| $C_8H_{17}O$—⟨O⟩—N=CH—⟨O⟩—C≡N | C.N; | 79, | N.I; | 94.5 |

6. p-alkyl-p'-cyanobiphenyl

| | | | | |
|---|---|---|---|---|
| $C_5H_{11}$—⟨O⟩—⟨O⟩—C≡N | C.N; | 22.5, | N.I; | 35 |
| $C_5H_{13}$—⟨O⟩—⟨O⟩—C≡N | C.N; | 13.5, | N.I; | 29 |
| $C_7H_{15}$—⟨O⟩—⟨O⟩—C≡N | C.N; | 28.5, | N.I; | 42 |

7. p-alkoxy-p'-cyanobiphenyl

| | | | | |
|---|---|---|---|---|
| $C_6H_{13}O$—⟨O⟩—⟨O⟩—C≡N | C.N; | 58, | N.I; | 76.5 |

8. p-cyanophenyl-p'-alkylbenzoate

| | | | | |
|---|---|---|---|---|
| $C_3H_7$—⟨O⟩—COO—⟨O⟩—C≡N | C.I; | 99, | I.N; | 53.5 |
| $C_4H_9$—⟨O⟩—COO—⟨O⟩—C≡N | C.I; | 66, | I.N; | 42 |
| $C_5H_{11}$—⟨O⟩—COO—⟨O⟩—C≡N | C.I; | 63, | I.N; | 56.5 |
| $C_6H_{13}$—⟨O⟩—COO—⟨O⟩—C≡N | C.N; | 44, | N.I; | 48 |
| $C_7H_{15}$—⟨O⟩—COO—⟨O⟩—C≡N | C.N; | 44, | N.I; | 56.5 |
| $C_8H_{17}$—⟨O⟩—COO—⟨O⟩—C≡N | C.N; | 45, | N.I; | 54 |

9. p-cyanophenyl-p'-acyloxybenzoate

| | | | | |
|---|---|---|---|---|
| $C_5H_{11}COO$—⟨O⟩—COO—⟨O⟩—C≡N | C.N; | 68, | N.I; | 86.5 |
| $C_6H_{13}COO$—⟨O⟩—COO—⟨O⟩—C≡N | C.N; | 85.5, | I.N; | 54 |

10. p-cyanophenyl-p'-alkylcarbonate-benzoate

| | | | | |
|---|---|---|---|---|
| $C_5H_{11}OCOO$—⟨O⟩—COO—⟨O⟩—C≡N | C.N; | 74, | I.N; | 61 |
| $C_4H_{13}OCOO$—⟨O⟩—COO—⟨O⟩—C≡N | C.N; | 48, | N.I; | 77.5 |

TABLE 1-continued

Y⟨O⟩X⟨O⟩C≡N

C$_8$H$_{17}$OCOO⟨O⟩COO⟨O⟩C≡N  C.N; 72.5, N.I; 77

Figure 4:
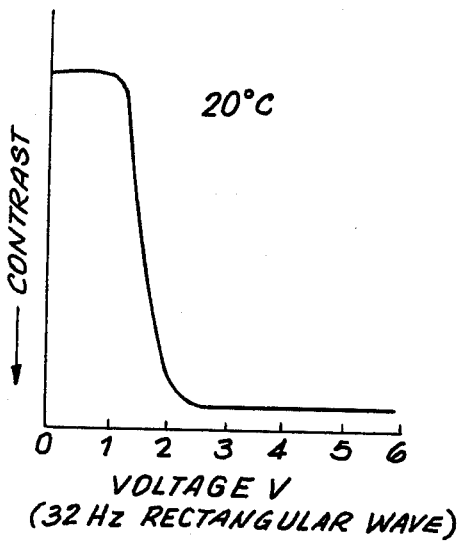
FIG. 4 is a voltage-contrast characteristic for a p-alkylbenzylidene-p'-cyanoaniline composition at 20° C.

The compounds in the Groups labelled 1 through 5 have the anil radical in the center of the molecule, this radical corresponding to X in the general formula given at the head of the Table. The compounds of Group 1 have a relatively low transition temperature for the change between crystalline and nematic phases and a relatively wide liquid crystal phase range so that compositions having a mesomorphic phase range from 0° C to 60° C can readily be made by mixing such compounds. However, the anil radical is easily affected by moisture as well as by oxygen. The contrast afforded by a typical composition as a function of voltage is shown in FIG. 4. As is evident, adequate contrast cannot be obtained at a voltage near 1.5 V which is that afforded by a single cell so that the cell voltage must be boosted if the system is to be operated by a single electrochemical cell.

The compounds of Groups 6 and 7 are stable and have an especially low transition temperature for the change from crystalline to nematic phase so that it is possible to prepare compositions which are operable at temperatures lower than 0° C. However, the compounds of Group 6 have a low phase change temperature for the transition from nematic to isotropic liquid so that it is very difficult to make a composition from such compounds which can operate over the range from 0° C to 50° C, such a range being necessary for wristwatches.

Figure 5:
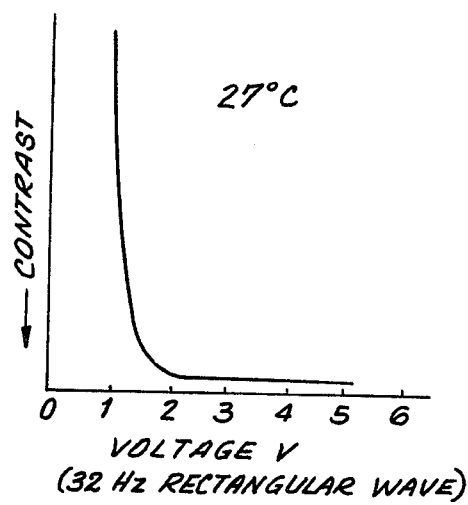
FIG. 5 is a voltage-contrast characteristic curve for a p-cyanophenyl-p'-alkylbenzoate composition.

The compounds of Groups 8 to 10 use an ester group to bind the two benzene rings together. The ester group is much more stable than the anil radical. Also, the compounds of Group 8 which is the p-cyanophenyl-p'-alkylbenzoate type have relatively low crystal-to-nematic phase transition temperatures. An important point is that the dielectric anisotropy of the above compound, namely Δε, is about 15 which is greater than that of the compounds of the other groups. Accordingly, the compositions used in the display means of the present invention are based on the p-cyanophenyl-p'-alkylbenzoates. The voltage-contrast characteristic curve of such a composition is shown in FIG. 5, this curve making it evident that full contrast is available at voltages as low as 1.5.

Table 2 shows the phase change temperatures for compositions based only upon cyanophenyl-alkyl benzoates.

TABLE 2

R⟨O⟩COO⟨O⟩C≡N composition and temperature of phase change

| composition | Wt. % | temperature of phase change (° C) |
|---|---|---|
| 1. composition composed of | | |
| p-cyanophenyl-p'-n-butylbenzoate | 26 | |
| p-cyanophenyl-p'-n-hexylbenzoate | 45 | C.N; 18~20 |
| p-cyanophenyl-p'-n-heptylbenzoate | 29 | N.I; 47 |
| 2. composition composed of | | |
| p-cyanophenyl-p'-n-hexylbenzoate | 33.3 | C.N; 20~21 |
| p-cyanophenyl-p'-n-heptylbenzoate | 33.4 | N.I; 52 |
| p-cyanophenyl-p'-n-octylbenzoate | 33.3 | |
| 3. composition composed of | | |
| p-cyanophenyl-p'-n-butylbenzoate | 10.2 | |
| p-cyanophenyl-p'-n-hexylbenzoate | 29.9 | C.N; 12~15 |
| p-cyanophenyl-p'-n-heptylbenzoate | 30.0 | N.N; 51 |
| p-cyanophenyl-p'-n-octylbenzoate | 29.9 | |
| 4. composition composed of | | |
| p-cyanophenyl-p'-n-propylbenzoate | 4.2 | |
| p-cyanophenyl-p'-n-butylbenzoate | 12.0 | |
| p-cyanophenyl-p'-n-pentylbenzoate | 13.8 | C.N; 11~12 |
| p-cyanophenyl-p'-n-hexylbenzoate | 23.4 | N.I; 51 |
| p-cyanophenyl-p'-n-heptylbenzoate | 23.4 | |
| p-cyanophenyl-p'-n-octylbenzoate | 23.2 | |

As is evident from Table 2, compositions based only upon cyanophenyl-alkylbenzoates have a high transition temperature for the transition from the crystalline to the nematic phase, so that a temperature range of 0° C to 50° C for the nematic phase cannot be obtained. Consequently, in order to obtain a liquid crystal composition with a wide operating temperature range, it is necessary to add liquid crystal material having a low dielectric anisotropy, either positive or negative, to a composition composed principally of cyanophenyl-alkylbenzoates, if such a composition is to be satisfactory for use in the display device of a wristwatch. It should be noted, that the addition of a relatively small quantity of the material with low dielectric anisotropy will not take the composition out of the range in which it can be operated by a single 1.5 volt cell without a booster circuit.

Table 3 shows examples of liquid crystal compounds suitable for addition to the cyanophenyl-alkylbenzoates, and their temperature characteristics.

TABLE 3

LIQUID CRYSTAL COMPOUND HAVING SMALL POSITIVE OR NEGATIVE DIELECTRIC ANISOTROPY AND ITS TEMPERATURE CHARACTERISTIC

| compound | temperature of phase change (° C) |
|---|---|
| p-n-hexyloxyphenyl-p'-n-butylbenzoate | C.N; 29, N.I; 50 |
| p-n-hexyloxyphenyl-p'-n-amylbenzoate | C.N; 40, N.I; 59 |
| p-n-heptyloxyphenyl-p'-n-amylbenzoate | C.N; 41, N.I; 56 |
| p-n-amylphenyl-p'-n-heptyloxybenzoate | C.N; 45, N.I; 61 |
| p-n-hexyloxy-p'-n-heptanoyloxybenzoate | C.N; 43, N.I; 81 |
| p-n-amyloxy-p'-n-hexylcarbonatebenzoate | C.N; 41, N.I; 89 |

In addition to the compounds having small positive or negative dielectric anisotropy as shown in Table 3, it is possible to use homologues and mixtures thereof. Other suitable additives are MBBA (p-methoxybenzylidene-p'-n-butylaniline), EBBA (p-ethoxybenzylidene-p'-n-butylaniline), or p-methoxy-p'-n-butylazoxybenzene, etc.

Table 4 shows liquid crystal compositions based on cyanophenyl-alkylbenzoates and incorporating appropriate, selected compounds of low positive or negative dielectric anisotropy in order to provide the requisite temperature range.

TABLE 4
LIQUID CRYSTAL COMPOSITION IN WHICH COMPOSITION HAVING SMALL POSITIVE OR NEGATIVE DIELECTRIC ANISOTROPY IS ADDED, AND ITS TEMPERATURE CHARACTERISTIC

| composition | Wt. % | temperature of phase change (° C) |
|---|---|---|
| Example 1 | | |
| p-cyanophenyl-p'-n-butylbenzoate | 8.2 | |
| p-cyanophenyl-p'-n-hexylbenzoate | 23.9 | |
| p-cyanophenyl-p'-n-heptylbenzoate | 24.0 | C.N; 9, N.I; 50 |
| p-cyanophenyl-p'-n-octylbenzoate | 23.9 | |
| p-n-hexyloxyphenyl-p'-n-butylbenzoate | 20.0 | |
| Example 2 | | |
| p-cyanophenyl-p'-n-propylbenzoate | 3.4 | |
| p-cyanophenyl-p'-n-butylbenzoate | 9.6 | |
| p-cyanophenyl-p'-n-pentylbenzoate | 11.0 | |
| p-cyanophenyl-p'-n-hexylbenzoate | 18.7 | C.N; 0~2 |
| p-cyanophenyl-p'-n-heptylbenzoate | 18.7 | N.I; 50 |
| p-cyanophenyl-p'-n-octylbenzoate | 18.6 | |
| p-n-hexyloxyphenyl-p'-n-butylbenzoate | 20.0 | |
| Example 3 | | |
| p-cyanophenyl-p'-n-propylbenzoate | 2.9 | |
| p-cyanophenyl-p'-n-butylbenzoate | 8.4 | |
| p-cyanophenyl-p'-n-pentylbenzoate | 9.7 | C.N; 2, |
| p-cyanophenyl-p'-n-hexylbenzoate | 16.4 | N.I; 50 |
| p-cyanophenyl-p'-n-heptylbenzoate | 16.4 | |
| p-cyanophenyl-p'-n-octylbenzoate | 16.2 | |
| p-n-hexyloxyphenyl-p'-n-butylbenzoate | 30.0 | |

Figure 6:
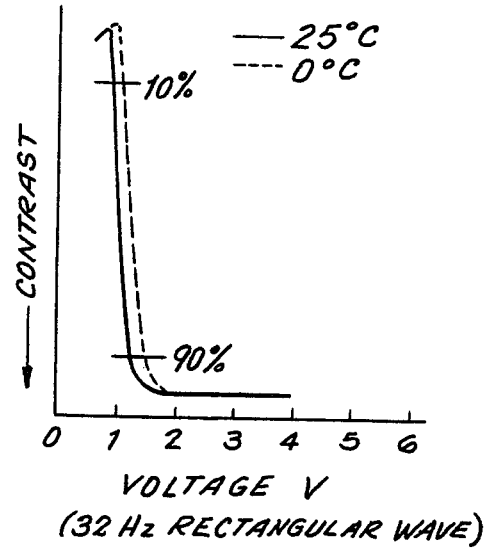
FIG. 6 is a voltage-contrast characteristic curve for a composition in accordance with the present invention.

All of the compositions in Table 4 give sufficient response to a voltage of 1.5 V. A voltage-contrast curve which is representative of Example 2 of Table 4 is shown in FIG. 6.

As a general rule, the voltage-contrast curve is shifted toward higher voltage as the temperature is decreased. The threshold voltage, defined above as the voltage at which the contrast is 90% of the saturation value, is shifted by an amount equal to 0.1 V to 0.2 V on dropping the temperature from about 25° C to 0° C. As is evident from the curves of FIG. 6, even at 0° C the voltage of a single electrochemical cell is adequate to drive the system without a booster in the circuitry.

The voltage-contrast characteristic curve also depends upon the thickness of the liquid crystal layer; the thinner the layer, the lower are Vth and Vsa. Accordingly, the liquid crystal layer should be as thin as possible. However, if the thickness is below about 5 $\mu$, any slight variation in thickness due to non-uniformity of the cell plates will give rise to interference colors. Consequently it is preferable that a layer of thickness between 5 and 10 $\mu$ be employed.

Figure 7:
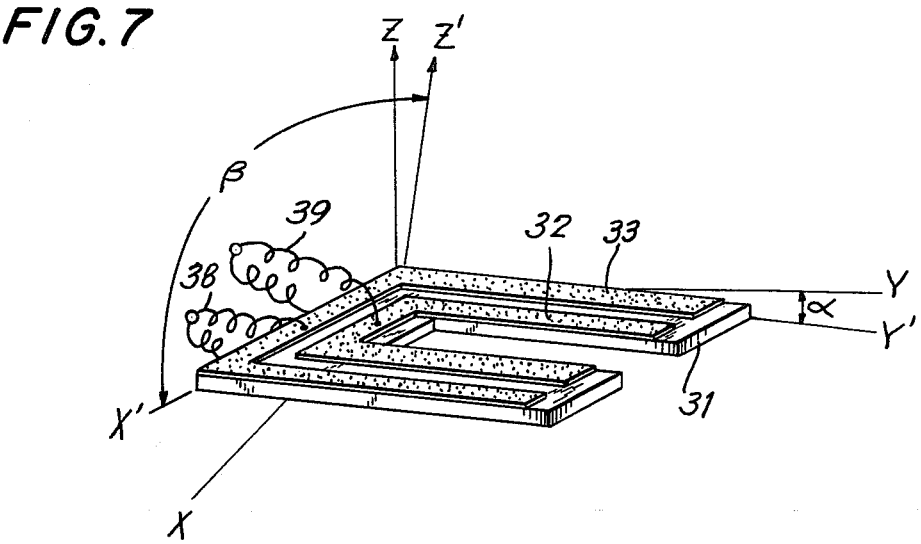
FIG. 7 is a view in perspective of a quartz crystal vibrator such as is incorporated in the wristwatch of the present invention.
Figure 8:
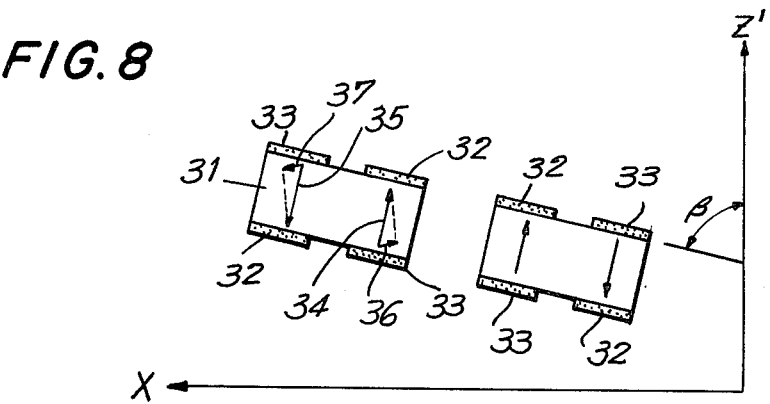
FIG. 8 is a section through the vibrator of FIG. 7 showing the arrangement of the electrodes and the forces thereon.

The piezoelectric vibrator which serves as the time standard in the present invention is an important factor in achieving minimal size for a wristwatch. FIGS. 7 and 8 show such a vibrator and the arrangement of electrodes thereon. As is evident from FIG. 8, the thickness of the vibrator is substantial with respect to the width of the vibrator. In cutting the vibrator from the crystal, angle $\alpha$ as shown in FIG. 7 may lie between about 0° and 10°. In FIGS. 7 and 8, vibrator 31 is of the tuning fork type and consequently vibrates in the flexural mode. The cutting directions of the original quartz crystal are such that the plate cut therefrom is of the NT-cut. As can be seen from FIG. 8, electrode 32 is the inner electrode on the upper surface and the outer electrode on the lower surface of the tuning fork while electrode 33 is the outer electrode on the upper surface and the inner electrode on the lower surface. Corresponding electrodes on the upper and lower surfaces of the vibrator are joined by leads 38 and 39.

In FIG. 7 X, Y and Z are respectively the electric axis, the mechanical axis and the optical axis of the vibrator. The vibrator is made from a plate in which the plate is rotated by an amount $\alpha$ around the X-axis and further rotated by an amount $\beta$ around the Y'-axis, into which the Y-axis is moved by the rotation around the X-axis. As aforenoted, $\alpha$ may lie between 0° and 10°; angle $\beta$ may lie between 50° and 70° or −50° and −70°.

When positive and negative voltages are applied respectively to electrodes 32 and 33 of the vibrator, electric fields such as are indicated by arrows 34 and 35 in FIG. 8 are applied to the interior of the quartz crystal. Components of the electric fields 35 and 36 in the direction of the X-axis are indicated by the arrows 36 and 37. These cause distortion of the quartz crystal. In each tine of the tuning fork, the component of the electric field in the X-direction is different with respect to the center line of the tine, so that the quartz crystal vibrator tends to expand on one side and contract on the other. Consequently, as an alternating current is applied to the electrodes, a symmetrical flexural vibration takes place in vibrator 31.

Conventional tuning fork vibrators are produced from a quartz crystal plate by a mechanical processing method using a device such as a diamond cutter as a result of which the rate of production is low and the cost is relatively high. Moreover, such vibrators cannot be made in thickness less than about 0.5 mm, width less than about 1.5 mm and length less than about 6 mm. Consequently, such vibrators cannot present the full advantages of miniaturization. In contrast, since the tuning fork vibrator of the present invention can be made by a chemical processing method including photo-etching, an extremely small and, particularly, an extremely thin vibrator can be produced. In accordance with the present invention, a vibrator can be prepared which is about 0.1 mm thick, about 1 mm wide and about 4.5 mm long.

Summing up, the electronic circuitry of the present invention employs a C MOS IC operating at a maximum voltage of 1.5 V and which is free of a booster. The liquid crystal composition is based on a mixture of p-cyanophenyl-p'-n-alkylbenzoates with at least one p-n-alkyloxyphenyl-p'-n-alkylbenzoate, such mixtures having a mesomorphic temperature range as low as 0° C and as high as 50° C and a threshold voltage of 1.5 or lower. Finally, the peizoelectric crystal is miniaturized to the point where it is no more than 0.5 mm thick. The combination of these features makes it possible to construct a wristwatch movement which is less than 5 mm in thickness.

It will thus be seen that the objects set forth above, among those made apparent from the preceding description, are efficiently attained, and, since certain changes may be made in the above article without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A wristwatch, comprising opposed electrode plates for forming a cell for holding a liquid crystal composition therebetween, said electrode plates having transparent electrodes at the inner surfaces thereof for forming a liquid crystal display, the inner surfaces of said electrode plates being oriented at right angles to each other with respect to the property of aligning adjacent molecules of nematic liquid crystals of high positive dielectric anisotropy, polarizer and analyzer plates sandwiching said electrode plates, a small piezoelectric vibrator to serve as time standard for said wristwatch, electronic circuitry including a complementary type field effect transistor for converting the time standard supplied by said vibrator into indicia in said liquid crystal display, said circuitry being free of a voltage booster, a liquid crystal composition of high positive dielectric anisotropy between said plates, and a single electrochemical cell, said composition having a wide mesomorphic phase including room temperature and being activatable to 90% of saturation at a temperature at least as low as about 9° C by the voltage supplied by said single electrochemical cell, the voltage of said single electrochemical cell being approximately 1.5 V or less, said composition consisting essentially of a majority of at least two p-cyanophenyl-p'-n-alkylbenzoates wherein said alkyl group is from 3 to 8 carbon atoms in length and enough of a compound of low dielectric anisotropy to lower the crystalline-to-nematic phase temperature at least to as low as about 9° C, said compound being selected from the group consisting of p-n-alkoxyphenyl-p'-n-alkyl benzoates where said alkoxy group is from 5 to 7 carbon atoms in length and said alkyl group is from 4 to 7 carbon atoms in length.

2. The wristwatch as defined in claim 1, wherein said electrochemical cell and said liquid crystal display cell are disposed in side-by-side relationship.

3. The wristwatch as defined in claim 1, wherein said liquid composition consists essentially of:

|  | Wt. % |
|---|---|
| p-cyanophenyl-p'-n-butylbenzoate | 8.2 |
| p-cyanophenyl-p'-hexybenzoate | 23.9 |
| p-cyanophenyl-p'-heptylbenzoate | 24.0 |
| p-cyanophenyl-p'-n-octylbenzoate | 23.9 |

| | Wt. % |
|---|---|
| p-n-hexyloxyphenyl-p'-n-butylbenzoate | 20.0 . |

4. The wristwatch as defined in claim 1, wherein said liquid crystal composition consists essentially of:

|  | Wt. % |
|---|---|
| p-cyanophenyl-p'-n-propylbenzoate | 3.4 |
| p-cyanophenyl-p'-n-butylbenzoate | 9.6 |
| p-cyanophenyl-p'-n-pentylbenzoate | 11.0 |
| p-cyanophenyl-p'-n-hexylbenzoate | 18.7 |
| p-cyanophenyl-p'-n-octylbenzoate | 18.6 |
| p-n-hexyloxyphenyl-p'-n-butylbenzoate | 20.0 . |

5. The wristwatch as defined in claim 1, wherein said liquid crystal composition consists essentially of:

|  | Wt. % |
|---|---|
| p-cyanophenyl-p'-n-propylbenzoate | 2.9 |
| p-cyanophenyl-p'-n-butylbenzoate | 8.4 |
| p-cyanophenyl-p'-n-pentylbenzoate | 9.7 |
| p-cyanophenyl-p'-n-hexylbenzoate | 16.4 |
| p-cyanophenyl-p'-n-heptylbenzoate | 16.4 |
| p-cyanophenyl-p'-n-octylbenzoate | 16.2 |
| p-n-hexyloxyphenyl-p'-n-butylbenzoate | 30.0 |

6. The wristwatch as defined in claim 1, wherein said vibrator is in the form of a tuning fork having a thickness of about 0.1 mm, a width of about 1 mm and a length of about 4.5 mm, said tuning fork having electrodes thereon for driving same.

7. The wristwatch as defined in claim 6, wherein said tuning fork is of a material selected from the group consisting of NT-cut quartz crystal and lithium tantalate.

8. The wristwatch as defined in claim 1, wherein said composition consists essentially of from 70 to 80 wt. % of a mixture of p-cyanophenyl-p'-n-alkylbenzoates wherein said alkyl group has from 3 to 8 carbon atoms therein and from 20 to 30% of at least one of said liquid crystal compounds of low dielectric anisotropy.

* * * * *